they produce blocking of polysynaptic reflexes in the spinal cord of cats, but exert no action on monosynaptic reflexes, on the myoneural junction or on the conduction in peripheral nerves.

2,930,817

2-PHENYL-3-METHYL-2,3-DIHYDROXY-HEXENES-(5)

Peter Werner Feit, Kongens Lyngby, Denmark, assignor to Løvens kemiske Fabrik ved A. Kongsted, Copenhagen, Denmark No Drawing. Application July 1, 1958
Serial No. 745,815

Claims priority, application Great Britain July 12, 1957

1 Claim. (Cl. 260—618)

This invention relates to 2-substituted 3-methyl-2,3-dihydroxyhexenes-(5) having the general formula:

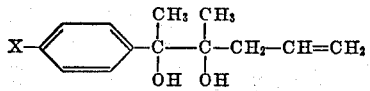

in which X denotes hydrogen or chlorine. Thus, the new compounds produced according to the invention are 2-phenyl-3-methyl-2,3-dihydroxyhexene-(5) and its p-chloro-derivative.

These compounds are hitherto unknown substances. They are useful as sedatives, particularly as tranquilizers. In biological tests with small mammals it has been found that the compounds are capable of exerting a long lasting sedative action producing muscular relaxation, and, with larger doses, loss of righting reflexes. Furthermore, they produce blocking of polysynaptic reflexes in the spinal cord of cats, but exert no action on monosynaptic reflexes, on the myoneural junction or on the conduction in peripheral nerves.

The new compounds compare favourably with known tranquilizers, such as 2-methyl-2-n-propyl-1,3-propanediol dicarbamate (meprobamate) and 2-p-chlorophenyl-3-methyl-2,3-butanediol (phenaglycodol) in their effectiveness in prolonging sleep produced by 1,5-dimethyl-5-(1-methylbutyl)-barbituric acid (hexobarbital). Thus, 2-phenyl-3-methyl-2,3-dihydroxyhexene-(5) has shown about four times the potency of meprobamate in this test.

Clinical experience has shown that 2-penyl-3-methyl-2,3-dihydroxyhexene-(5) compares favourably with meprobamate as a tranquilizer for male and female patients in the age range from 67 to 89 years suffering from senile psychic disturbances, such as depressions, confusions, restlessness and excitements. In 28% of the cases improvements superior to those obtained with meprobamate were observed, whereas in 22% of the cases the two medicaments produced equal improvements, and in 44% of the cases had no marked tranquilizing effect. In 6% of the cases meprobamate was superior. The toxicity of the said two medicaments was found to be practically the same.

The new compounds can advantageously be produced by reacting a compound selected from the group consisting of 2-phenyl and 2-p-chlorophenylacetoin with a compound selected from the group consisting of 2- propenyl-magnesium chloride and bromide and decomposing the Grignard-compound thereby formed to the desired compound and magnesiumhydroxy chloride or bromide, respectively.

The acetoin derivatives used as starting substances by the method according to the invention can be prepared as described in the following direction for the preparation of 2-p-chlorophenylacetoin:

2 g. of mercuric oxyde are dissolved in 20 ml. of 4 N sulphuric acid, and the solution is mixed with 30 ml. of methanol. To the mixture, a solution of 20 g. of p-chlorophenyl-methyl-ethinyl-carbinol (prepared in the known manner by reacting p-chloroacetophenone with acetylene) in 10 ml. of methanol is added dropwise at 60–65° C. during one and a half hours, and the mixture is kept at the said temperature for 3 hours. Then, 10 g. of potassium carbonate are added slowly, and the mixture is cooled. The resulting ketone is extracted with ether, and the ethereal solution is washed with water and dried over MgSO$_4$. The ether is evaporated, and the residue is fractionated in vacuo, yielding 15.5 g. of 2-p-chlorophenylacetoin, a hitherto unknown compound boiling at 147–148° C. at a pressure of 10 mm. of mercury.

2-phenylacetoin can be prepared in an analogous manner.

EXAMPLE 1

*Preparation of 2-phenyl-3-methyl-2,3-dihydroxyhexene-(5)*

2-propenyl-magnesium chloride is prepared in known manner from 12 g. of magnesium and 34.5 g. of 3-chloropropene in 120 ml. of anhydrous ether. To the resulting suspension, a solution of 16.4 g. of 2-phenylacetoin in 100 ml. of anhydrous ether is added slowly at 10° C. with stirring. The mixture is then heated to 25° C. and stirred at this temperature for 16 hours, whereafter it is decomposed with an aqueous solution of ammonium chloride, and the ether phase is separated. The ethereal solution is washed with water, dried over MgSO$_4$ and evaporated to dryness. A partly crystalline residue is obtained, which is crystallized completely with hexene. After repeated recrystallizations from benzene, the recovered 2-phenyl-3-methyl-2,3-dihydroxyhexene-(5) melts at 98–98.5° C.

EXAMPLE 2

*Preparation of 2-p-chlorophenyl-3-methyl-2,3-dihydroxyhexene-(5)*

2-propenyl-magnesium chloride is prepared in known manner from 6 g. of magnesium and 17.25 g. of 3-chloropropene in 60 ml. of anhydrous ether. To the resulting suspension, a solution of 10 g. of 2-p-chlorophenylacetoin in 50 ml. of anhydrous ether is added slowly at 10° C. with stirring. The mixture is then heated to 25° C. and stirred at this temperature for 16 hours, whereafter it is decomposed with an aqueous solution of ammonium chloride, and the ether phase is separated. The ethereal solution is washed with water, dried over MgSO$_4$ and evaporated to dryness. A partly crystalline residue is obtained, which is crystallized completely with hexane. After repeated recrystallizations from hexane and benzene, the recovered 2-p-chlorophenyl-3-methyl-2,3-dihydroxyhexene-(5) melts at 104.5–105.5° C.

I claim:

A member of the group consisting of 2-phenyl-3-methyl-2,3-dihydroxyhexene-(5) and its p-chloro-derivative.

References Cited in the file of this patent

Pansevich-Kolyada et al.: Chem. Abstracts, vol. 49 (1955), col. 6173–74 (1 page).